United States Patent
Yoneyama

(10) Patent No.: US 9,412,008 B2
(45) Date of Patent: Aug. 9, 2016

(54) TRACKING APPARATUS AND TRACKING METHOD

(71) Applicant: Olympus Imaging Corp., Shibuya-ku, Tokyo (JP)

(72) Inventor: Hisashi Yoneyama, Hino (JP)

(73) Assignee: OLYMPUS CORPORATION (JP)

(*) Notice: Subject to any disclaimer, the term of this patent is extended or adjusted under 35 U.S.C. 154(b) by 18 days.

(21) Appl. No.: 13/665,185

(22) Filed: Oct. 31, 2012

(65) Prior Publication Data
US 2013/0114854 A1 May 9, 2013

(30) Foreign Application Priority Data

Nov. 4, 2011 (JP) ................................. 2011-242703

(51) Int. Cl.
*G06K 9/00* (2006.01)
*G06T 7/20* (2006.01)
*H04N 5/232* (2006.01)
*H04N 5/235* (2006.01)

(52) U.S. Cl.
CPC ............ *G06K 9/00248* (2013.01); *G06T 7/204* (2013.01); *H04N 5/23212* (2013.01); *H04N 5/23219* (2013.01); *G06T 2207/10016* (2013.01); *H04N 5/2351* (2013.01); *H04N 5/23245* (2013.01)

(58) Field of Classification Search
CPC ............ H04N 5/23219; H04N 5/2353; H04N 5/23245; H04N 19/00587; H04N 2201/0084; G03B 13/36; G03B 17/16; G03B 7/28; G06K 9/00248; G06K 9/00281; G06K 9/00261; G06T 7/0022; G06T 2207/10016; G06T 7/20
See application file for complete search history.

(56) References Cited

U.S. PATENT DOCUMENTS

| | | | | |
|---|---|---|---|---|
| 5,812,193 | A | * | 9/1998 | Tomitaka et al. ............. 348/369 |
| 8,571,341 | B2 | * | 10/2013 | Hattori .......................... 382/254 |
| 2005/0031325 | A1 | | 2/2005 | Fujii |

(Continued)

FOREIGN PATENT DOCUMENTS

| | | |
|---|---|---|
| JP | 2605004 | 2/1997 |
| JP | 2005-055744 A | 3/2005 |
| JP | 2006-129272 A | 5/2006 |
| JP | 2011-044764 A | 3/2011 |

OTHER PUBLICATIONS

Birchfield et al., Elliptical Head Tracking Using Intensity Gradients and Color Histograms, 1998, Dept. of Comput. Sci., Stanford Univ., CA, USA, pp. 232-237.*

(Continued)

*Primary Examiner* — Utpal Shah
*Assistant Examiner* — Guillermo Rivera-Martinez
(74) *Attorney, Agent, or Firm* — Volpe and Koenig, P.C.

(57) ABSTRACT

A tracking apparatus includes an image data acquisition unit, a tracking process unit, a contrast information acquisition unit, a contrast information similarity evaluation unit, and a control unit. The image data acquisition unit acquires image data. The tracking process unit detects a candidate position of a tracking target in image data. The contrast information acquisition unit acquires contrast information at the candidate position. The contrast information similarity evaluation unit evaluates a similarity between contrast information at a position of the tracking target decided in a past frame and current frame. The control unit decides the position of the tracking target in the current frame based on the evaluation of the similarity.

4 Claims, 10 Drawing Sheets

(56) References Cited

U.S. PATENT DOCUMENTS

2008/0037827 A1* 2/2008 Corcoran et al. ............. 382/103
2010/0033579 A1* 2/2010 Yokohata et al. ............. 348/169
2010/0074557 A1* 3/2010 Oku et al. .................... 382/291
2010/0118163 A1* 5/2010 Matsugu et al. ......... 348/231.99
2010/0277609 A1* 11/2010 Abe ........................... 348/222.1
2011/0261225 A1* 10/2011 Niinami .................... 348/223.1

OTHER PUBLICATIONS

Office Action mailed in counterpart Japanese Patent Application No. 2011-242703 on Sep. 1, 2015, consisting of 7 pp. (English translation provided).

* cited by examiner

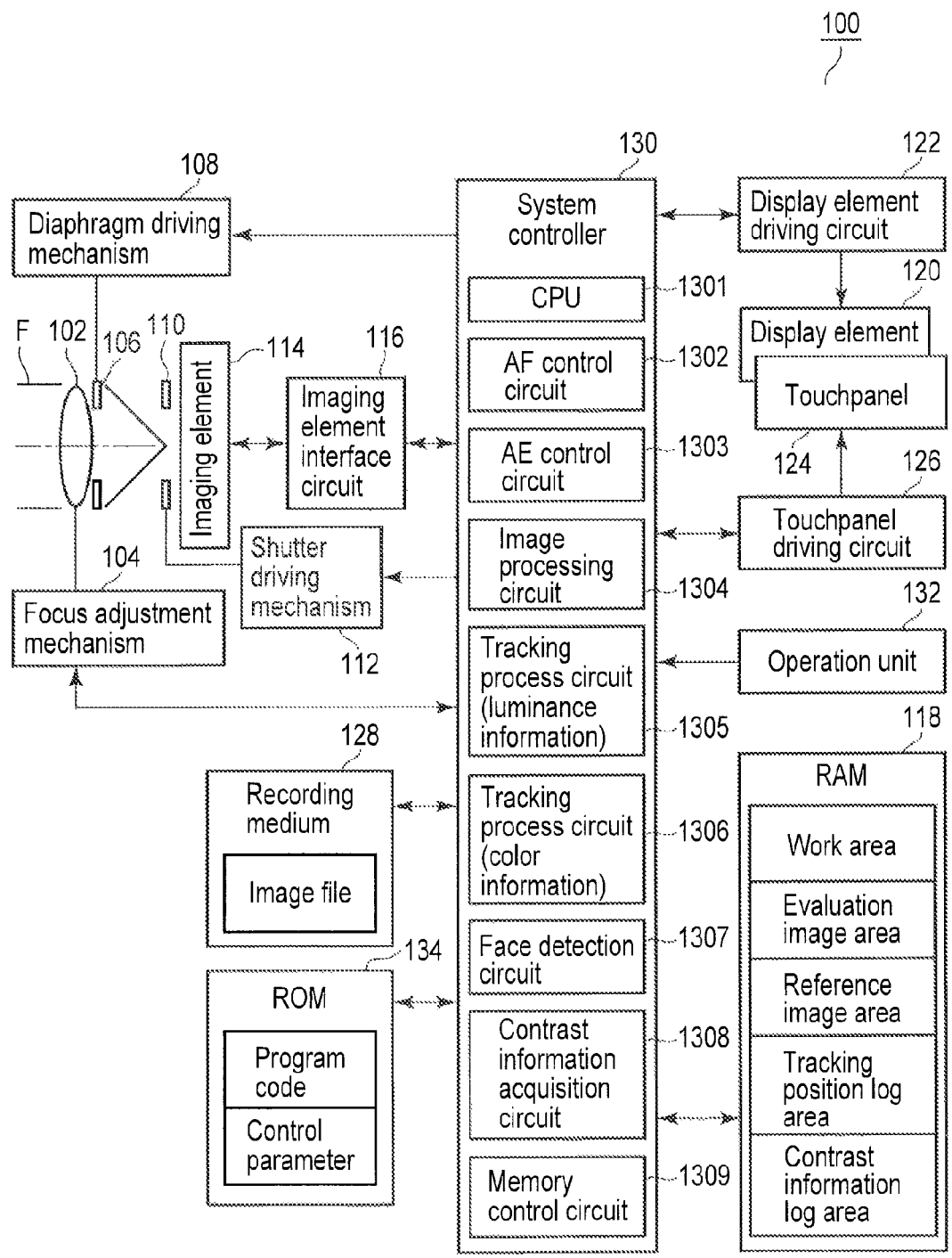
F I G. 1

TRACKING APPARATUS AND TRACKING METHOD

CROSS-REFERENCE TO RELATED APPLICATIONS

This application is based upon and claims the benefit of priority from prior Japanese Patent Application No. 2011-242703, filed Nov. 4, 2011, the entire contents of which are incorporated herein by reference.

BACKGROUND OF THE INVENTION

1. Field of the Invention

The present invention relates to a tracking apparatus and a tracking method to track a subject.

2. Description of the Related Art

It has heretofore been known to use a technique for performing automatic focus (AF) control and automatic exposure (AE) control to track a particular subject when photographing a moving body or when obtaining moving images. A tracking process is used to track the particular subject. There are various types of tracking processes, such as a tracking process that uses color information as has been known in Japanese Patent No. 2605004, a tracking process that uses luminance information, and a tracking process that uses face detection.

BRIEF SUMMARY OF THE INVENTION

According to a first aspect of the invention, there is provided a tracking apparatus comprising: an image data acquisition unit configured to acquire image data per frame; a tracking process unit configured to detect a candidate position of a tracking target in each image data acquired per frame; a contrast information acquisition unit configured to acquire contrast information at the candidate position of the tracking target in the image data detected per frame; a contrast information similarity evaluation unit configured to evaluate, in accordance with the contrast information acquired by the contrast information acquisition unit, a similarity between contrast information at a position of the tracking target decided in a past frame and contrast information at the candidate position of the tracking target acquired in a current frame; and a control unit configured to decide, based on the evaluation, the candidate position of the tracking target having the contrast information with the highest similarity relative to the contrast information at the position of the tracking target, as the position of the tracking target in the current frame.

According to a second aspect of the invention, there is provided a tracking method comprising causing an image data acquisition unit to acquire image data per frame; causing a tracking process unit to detect a candidate position of a tracking target in each image data acquired per frame; causing a contrast information acquisition unit to acquire contrast information at the candidate position of the tracking target in the image data detected per frame; causing a contrast information similarity evaluation unit to evaluate a similarity between contrast information at a position of the tracking target decided in a past frame and contrast information at the candidate position of the tracking target acquired in a current frame; and causing a control unit to decide, as the position of the tracking target in the current frame, the candidate position of the tracking target having the contrast information with the highest similarity relative to the contrast information at the position of the tracking target determined in the past frame.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing a configuration as one example of an imaging apparatus comprising a tracking apparatus according to an embodiment of the present invention;

DETAILED DESCRIPTION OF THE INVENTION

Figure 2A:
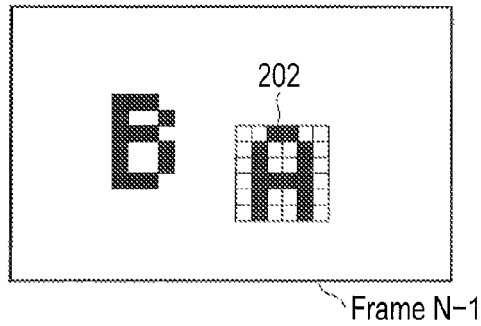
FIGS. 2A and 2B are diagrams illustrating a tracking process that uses luminance information.

Hereinafter, an embodiment of the present invention will be described with reference to the drawings.

FIG. 1 is a diagram showing a configuration as one example of an imaging apparatus comprising a tracking apparatus according to an embodiment of the present invention. An imaging apparatus 100 shown in FIG. 1 comprises a photographic optical system 102, a focus adjustment mechanism 104, a diaphragm 106, a diaphragm driving mechanism 108, a shutter 110, a shutter driving mechanism 112, an imaging element 114, an imaging element interface (IF) circuit 116, a RAM 118, a display element 120, a display element driving circuit 122, a touchpanel 124, a touchpanel driving circuit 126, a recording medium 128, a system controller 130, an operation unit 132, and a ROM 134.

The photographic optical system 102 is an optical system which focuses a light flux F from an unshown subject on a light receiving surface of the imaging element 114. The photographic optical system 102 has a plurality of lenses such as a focus lens. The focus adjustment mechanism 104 has a motor and its driving circuit. The focus adjustment mechanism 104 drives the focus lens in the photographic optical system 102 in its optical axis direction (chain line direction shown) under the control of a CPU 1301 in the system controller 130.

The diaphragm 106 is configured to open/close, and adjusts the light flux F entering the imaging element 114 via the photographic optical system 102. The diaphragm driving mechanism 108 has a driving mechanism for driving the diaphragm 106. The diaphragm driving mechanism 108 drives the diaphragm 106 under the control of the CPU 1301 in the system controller 130.

The shutter 110 is configured to allow the light receiving surface of the imaging element 114 to be shielded from light or exposed to light. The shutter 110 adjusts the exposure time of the imaging element 114. The shutter driving mechanism 112 has a driving mechanism for driving the shutter 110, and drives the shutter 110 under the control of the CPU 1301 in the system controller 130.

The imaging element 114 has the light receiving surface on which the light flux F from a subject focused via the photographic optical system 102 is formed into an image. The light receiving surface of the imaging element 114 comprises a plurality of two-dimensionally arranged pixels. A color filter is provided on the light entrance side of the light receiving surface. The imaging element 114 converts the figure (subject figure) corresponding to the light flux F formed into the image on the light receiving surface to an electric signal (hereinafter referred to as an image signal) corresponding to the amount of light. Regarding the imaging element 114, imaging elements having various configurations are known, such as a CCD imaging element and a CMOS imaging element. Regarding the color arrangement of the color filter, various arrangements such as a Bayer arrangement are known. The present embodiment is not limited to a particular configuration of the imaging element 114 and can use imaging elements having various configurations.

The imaging element interface circuit 116 drives the imaging element 114 under the control of the CPU 1301 in the system controller 130. The imaging element interface circuit 116 reads the image signal obtained by the imaging element 114 under the control of the CPU 1301 in the system controller 130, and subjects the read image signal to analog processing such as correlated double sampling (CDS) and automatic gain control (AGC). The imaging element interface circuit 116 converts the analog-processed image signal to a digital signal (hereinafter referred to as image data).

The RAM 118 is, for example, an SDRAM. The RAM 118 has, as storage areas, a work area, an evaluation image area, a reference image area, a tracking position log area, and a contrast information log area.

The work area is a storage area provided in the RAM 118 to temporarily store data generated in each section of the imaging device 100, for example, image data obtained by the imaging element interface circuit 116.

The evaluation image area is a storage area provided in the RAM 118 to temporarily store evaluation image data. The evaluation image data is image data for a frame containing a subject which is a tracking target in a later-described tracking process. The tracking process is performed to track the tracking target.

The reference image area is a storage area provided in the RAM 118 to temporarily store reference image data. The reference image data is image data for a search target frame of the tracking target in the later-described tracking process. In the tracking process, the reference image data is searched.

The tracking position log area is a storage area provided in the RAM 118 to temporarily store a tracking position log. The tracking position log is a log to record a tracking position obtained as a result of the tracking process.

The contrast information log area is a storage area provided in the RAM 118 to temporarily store a contrast information log. The contrast information log is a log to record changes of contrast information obtained by a contrast information acquisition process in the tracking process. In the present embodiment, for example, the past ten frames of contrast information are recorded.

The display element 120 is, for example, a liquid crystal display (LCD), and displays various images such as images for live view, and images recorded in the recording medium 128. The display element driving circuit 122 drives the display element 120 in accordance with the image data input from the CPU 1301 of the system controller 130, and displays images on the display element 120.

The touchpanel 124 is integrally formed on a display screen of the display element 120, and detects, for example, a contact position of the finger of a user on the display screen. The touchpanel driving circuit 126 drives the touchpanel 124, and outputs, to the CPU 1301 of the system controller 130, a contact detection signal from the touchpanel 124. The CPU 1301 detects the user's contact operation on the display screen from the contact detection signal, and performs processing corresponding to the contact operation.

The recording medium 128 is, for example, a memory card. An image file obtained by photography operation is recorded in the recording medium 128. The image file is a file which comprises image data and a predetermined header attached thereto. For example, data indicating a photography condition and data indicating a tracking position are recorded in the header as tag data.

The system controller 130 has, as control circuits for controlling the operation of the imaging device 100, the CPU 1301, an AF control circuit 1302, an AE control circuit 1303, an image processing circuit 1304, a tracking process circuits 1305 and 1306, a face detection circuit 1307, a contrast information acquisition circuit 1308, and a memory control circuit 1309.

The CPU 1301 controls the operations of blocks outside the system controller 130 such as the focus adjustment mechanism 104, the diaphragm driving mechanism 108, the shutter driving mechanism 112, the display element driving circuit 122, and the touchpanel driving circuit 126, and the operations of the control circuits inside the system controller 130. The CPU 1301 also functions as a contrast information similarity evaluation unit and a control unit, and determines a final tracking position in a later-described priority tracking determination process or tracking position correction determination process.

The AF control circuit 1302 controls a contrast AF process. More specifically, the AF control circuit 1302 extracts a high-frequency component of the image data obtained by the imaging element interface circuit 116, and accumulates the extracted high-frequency component to acquire an in-focus evaluation value for AF. The CPU 1301 evaluates the contrast of the image data in accordance with the in-focus evaluation value, and at the same time, controls the focus adjustment mechanism 104, thereby bringing the focus lens into focus.

The AF control circuit 1303 controls AE operation. More specifically, the AE control circuit 1303 calculates subject luminance by using the image data obtained by the imaging element interface circuit 116. In accordance with the subject luminance, the CPU 1301 calculates, for example, an opening amount (aperture value) of the diaphragm 106 during exposure, the release time (shutter speed) of the shutter 110, the imaging element sensitivity, and the ISO rating.

The image processing circuit 1304 performs various kinds of image processing for the image data. The image processing includes, for example, color correction processing, gamma (γ) correction processing, and compression processing. The image processing circuit 1304 also expands compressed image data.

The tracking process circuit 1305 performs a tracking process that uses luminance information for the image data. The tracking process that uses the luminance information is briefly described. For example, a tracking target is set in frame N−1 shown in FIG. 2A. In this case, in the tracking process that uses the luminance information, image data in frame N−1 is stored in the evaluation image area of the RAM 118 as evaluation image data. Image data in a predetermined range 202 of the evaluation image data including the tracking target is set as standard image data. In the subsequent tracking process, a part corresponding to the standard image data 202 of the reference image data is searched for.

Figure 2B:
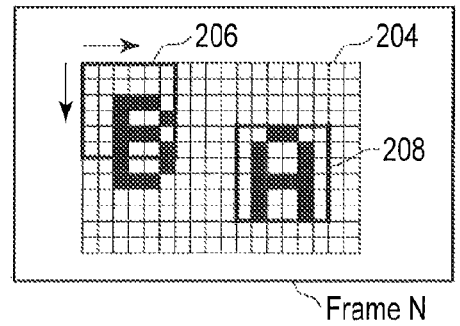

If the tracking process of frame N is shown by way of example, the image data for frame N is stored in the reference image area of the RAM 118 as reference image data. The correlation amount between image data in a predetermined search range 204 of the reference image data and the standard image data 202 is found to search for a part of the reference image data corresponding to the standard image data 202. The correlation amount is determined, for example, from the sum of absolute differences between the standard image data and the reference image data. The sum of absolute differences is the accumulation of absolute values of luminance differences found for the respective pixels. For example, if the sum of absolute differences between a region 206 in the reference image data and the standard image data 202, shown in FIG. 2B, is found, the region 206 of the reference image data and the standard image data 202 are obviously different image data, so that the sum of absolute differences is great. In contrast, if the sum of absolute differences between a region 208 of the reference image data and the standard image data 202 is found, the sum of absolute differences is small. Thus, the sum of absolute differences is smaller when the correlation amount with the standard image data 202 is greater. In the tracking process that uses the luminance information, a region having the maximum correlation, that is, the minimum sum of absolute differences is searched for from the reference image data. In the example shown in FIG. 2B, the region 208 is searched for. In the tracking position log area, a position having the highest correspondence in the region 208 is recorded as a tracking position. When there are a plurality of such positions, for example, a position close to the center of the region 208 is set as a tracking position. In the next tracking process, this tracking position is preferably used as the start position of the tracking process. This can reduce the time required for the tracking process.

Figure 3A:
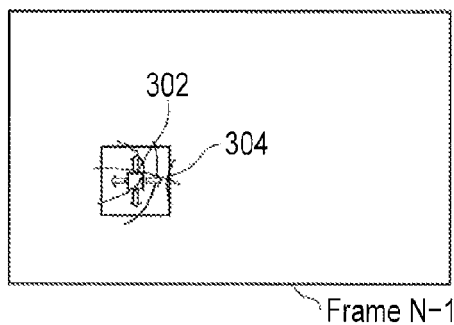
FIGS. 3A and 3B are diagrams illustrating a tracking process that uses color information.

The tracking process circuit 1306 performs a tracking process that uses color information for the image data. The tracking process that uses the color information is briefly described. In the tracking process that uses the color information, a tracking color region which is a region that can be determined to have the same color as the color set in the evaluation image data is searched for. When a given position 302 of the subject is specified in frame N−1 as shown in FIG. 3A, the color information for the position 302 in the evaluation image data is acquired. The position 302 is used as the start position of the tracking process to search for a region having the same color information as the position 302. More specifically, the color information is sequentially acquired from the start position to the periphery. The acquired color information is included in the region when this color information can be determined to be the same as the color information for the position 302. The acquired color information is not included in the region when this color information cannot be determined to be the same as the color information for the position 302. As a result of searching for the tracking color region in this way, a rectangular region 304 inscribed in the subject is the tracking color region, for example, when the subject has a single color as shown in FIG. 3A. The tracking position to be recorded in the tracking position log area is, for example, the gravity center position (which is the same as the position 302 in the example shown in FIG. 3A) of the tracking color region 304. In the next tracking process, this tracking position is used as the start position of the tracking process.

Figure 3B:
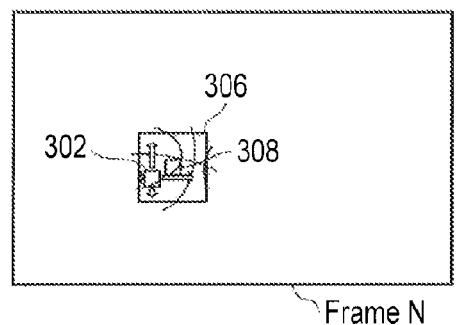

If the tracking process of frame N is shown by way of example, the tracking position 302 of frame N−1 is used as the start position of the tracking process, in a predetermined search range of the image data of frame N stored as the reference image data shown in FIG. 3B. Regions which can be determined to have the same color as the color of the tracking color region 304 are then searched for as tracking color regions sequentially from the periphery of the tracking position 302. In the example shown in FIG. 3B, a region 306 is the tracking color region.

Figure 4A:
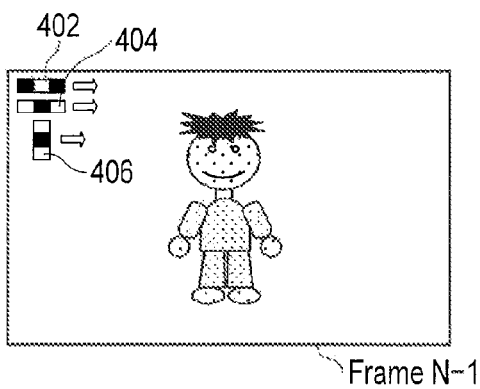
FIGS. 4A and 4B are diagrams illustrating a face detection process.
Figure 4B:
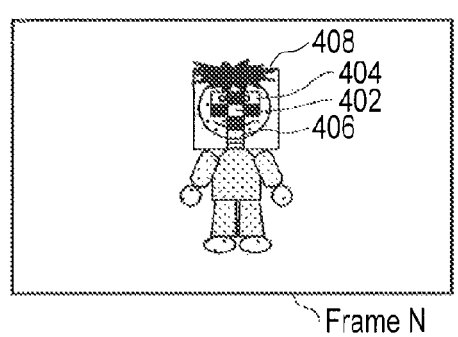

The face detection circuit 1307 detects the face of the subject (person) in the image data. A face detection process is briefly described. In the face detection process, the correlation amount between image data obtained in each frame and face parts 402, 404, and 406 shown in FIG. 4A is found. The face part 402 is image data corresponding to a shade pattern around the nose of the person. The face part 404 is image data corresponding to a shade pattern around the eyes of the person. The face part 406 is image data corresponding to a shade pattern around the mouth of the person. The correlation amount between the image data and the face parts 402, 404, and 406 is maximized at a predetermined arrangement that indicates the face of the person shown in FIG. 4B. Here, the face is present in a region 408 including the face parts 402, 404, and 406. The sizes of the face parts 402, 404, and 406 may be changed in accordance with the size of a preset search face. The face region is rectangular in FIG. 4B, but may otherwise be circular.

The contrast information acquisition circuit 1308 sets a predetermined area in the image data as a contrast acquisition area, and acquires contrast information in the contrast acquisition area. The in-focus evaluation value for AF obtained in the AF control circuit 1302 can be used as the contrast information.

The memory control circuit 1309 is an interface which is controlled, for example, by the CPU 1301 to access the RAM 118, the recording medium 128, and the ROM 134.

The operation unit 132 includes various operation members to be operated by the user. For example, the operation unit 132 includes a release button, a moving image button, a mode dial, a selection key, and a power supply button.

The release button has a first release switch and a second release switch. The first release switch is turned on when the release button is pressed halfway by the user. When the first release switch is turned on, photographic preparation operation such as an AF process is performed. The second release switch is turned on when the release button is fully pressed by the user. When the second release switch is turned on, exposure operation for still image photography is performed.

The moving image button is an operation member for indicating the start or end of moving image photography. If the moving image button is pressed by the user, a moving image photography process is started. If the moving image button is pressed during the execution of the moving image photography process, the moving image photography process is ended.

The mode dial is an operation member for selecting a photography setting of the imaging apparatus. In the present embodiment, for example, a still image photography mode and a moving image photography mode can be selected as the photography setting of the imaging apparatus. The still image photography mode is a photography setting for still image photography. The moving image photography mode is a photography setting for moving image photography.

The selection key is an operation member for selecting or deciding an item, for example, on a menu screen. If the selection key is operated by the user, an item is selected or decided on the menu screen.

The power supply button is an operation member for turning on or off the power supply of the imaging device. If the power supply button is operated by the user, the apparatus 100 is activated and becomes operable. If the power supply button is operated while the imaging device is activated, the apparatus 100 is set to a power saving standby state.

A program code for the CPU 1301 to perform various kinds of processing is stored in the ROM 134. Various control parameters are also stored in the ROM 134, such as control parameters necessary for the operations of the photographic optical system 102, the diaphragm 106, and the imaging element 114, and control parameters necessary for image processing in the image processing circuit 1304. Moreover, for example, data for face parts used in the face detection in the face detection circuit 1307, and data for displaying a tracking frame are also stored in the ROM 134.

Figure 5:
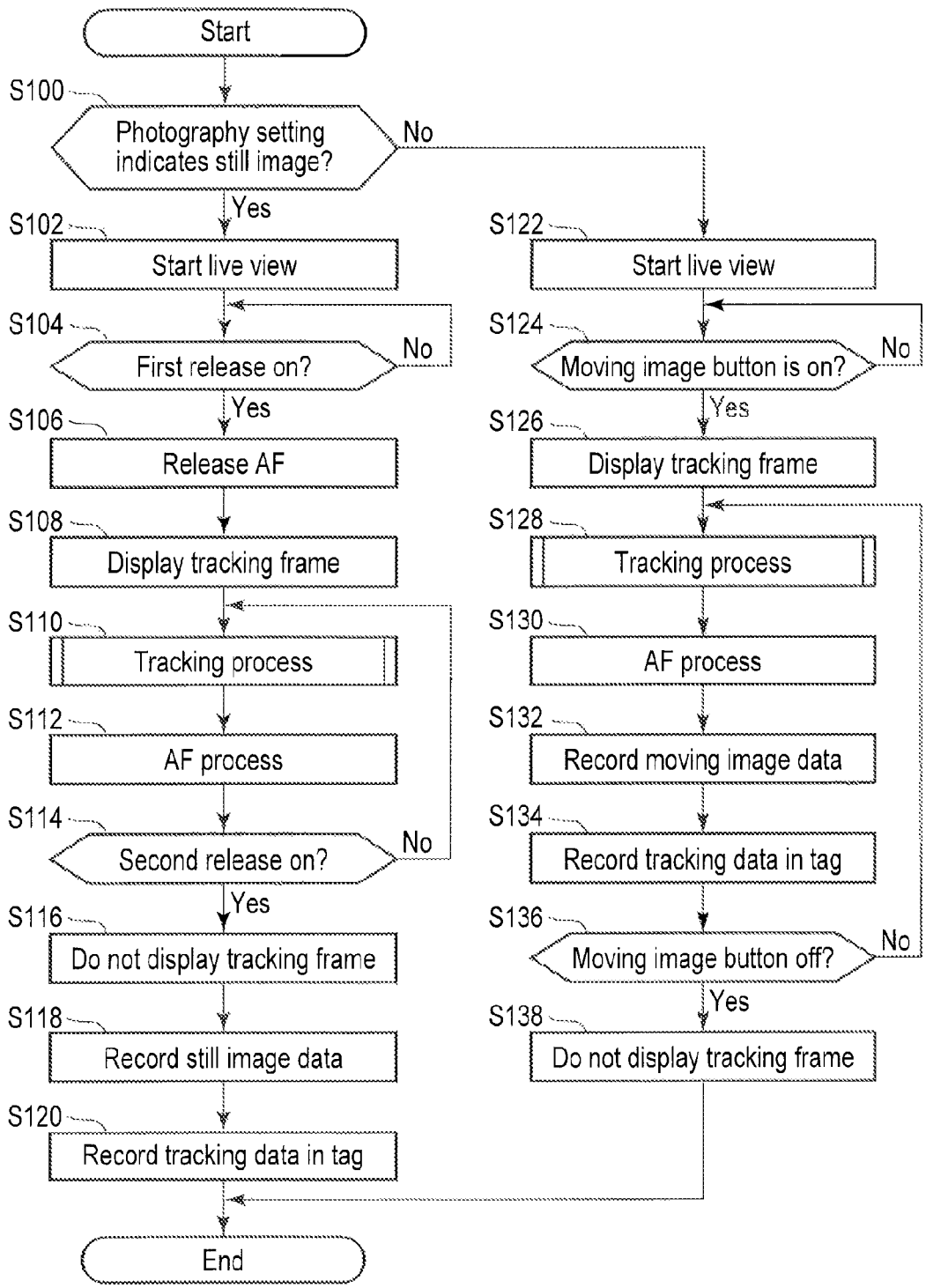
FIG. 5 is a flowchart showing photography operation of the tracking apparatus.

Now, the operation of the imaging apparatus according to the present embodiment is described. FIG. 5 is a flowchart showing photography operation of the imaging apparatus 100. The CPU 1301 reads a necessary program code from the ROM 134 to control the operation shown in FIG. 5.

In step S100, the CPU 1301 determines whether the current photography setting of the imaging apparatus 100 is the still image photography mode. As described above, the photography setting is set by the mode dial.

In step S100, when the photography setting is determined to be the still image photography mode, the CPU 1301 starts a live view operation in step S102. In the live view operation, the CPU 1301 controls the shutter driving mechanism 112 to release the shutter 110. The CPU 1301 then controls the imaging element interface circuit 116 to start the imaging by the imaging element 114. The CPU 1301 then inputs, to the image processing circuit 1304, the image data which has been stored in the work area of the RAM 118 as a result of the imaging by the imaging element 114, and the image data is subjected to image processing for live view display. The CPU 1301 then inputs, to the display element driving circuit 122, the image data which has been subjected to the image processing for the live view display, and an image is displayed on the display element 120. Moving images of the subject are displayed by repeating the above-described display operation. The user can observe the subject by the moving image display.

In step S104, the CPU 1301 determines whether the first release switch has been turned on. The CPU 1301 continues the live view operation until it is determined in step S104 that the first release switch has been turned on.

When determining in step S104 that the first release switch has been turned on, the CPU 1301 performs a release AF process in step S106. In the release AF, the focus lens is driven to an in-focus position by scan drive. In the scan drive, the CPU 1301 controls the focus adjustment mechanism 104 to drive the focus lens in one direction within a predetermined scan range, and at the same time, evaluates in-focus evaluation values sequentially calculated by the AC control circuit 1302. The CPU 1301 stops the driving of the focus lens at a lens position where contrast is maximized as a result of the evaluation of the in-focus evaluation values. Such scan drive is performed when there is a great difference between the position of the focus lens before AF and the in-focus position.

In step S108, the CPU 1301 controls the display element driving circuit 122 to display a tracking frame on the display element 120. Here, the tracking frame is displayed at the position of the tracking target on the screen of the display element 120. For example, a subject brought into focus by the release AF may be set as a tracking target, and the tracking frame may be displayed on this subject. When the face is detected by the face detection circuit 1307, the tracking frame may be displayed on the face. When the subject displayed on the screen of the display element 120 is specified by the touchpanel 124, the tracking frame may be displayed on this subject.

In step S110, the CPU 1301 performs the tracking process for tracking the subject. This tracking process will be described later.

In step S112, the CPU 1301 performs an AF process to bring the subject at the tracking position into focus, and performs an AE process so that the exposure for the subject at the tracking position will be correct.

In the AF process after the tracking process, the focus lens is driven to the in-focus position by the scan drive or wobbling drive. In the wobbling drive, the CPU 1301 determines whether the in-focus evaluation value calculated by the AF control circuit 1302 when the focus lens is driven has increased as compared with the in-focus evaluation value at the previous lens position. When the in-focus evaluation value has increased, the CPU 1301 slightly drives the focus lens in the same direction as the previous direction. When the in-focus evaluation value has decreased, the CPU 1301 slightly drives the focus lens in a direction opposite to the previous direction. Such operation is rapidly repeated to gradually drive the focus lens to the in-focus position.

In the AE process, the CPU 1301 calculates the opening amount (aperture value) of the diaphragm 106 and the release time (shutter speed) of the shutter 110 during this exposure so that the luminance of the subject at the tracking position calculated by the AE control circuit 1303 will reach a predetermined correct value (correct exposure).

In step S114, the CPU 1301 determines whether the second release switch has been turned on. When determining in step S114 that the second release switch has not been turned on, the CPU 1301 performs processes after the tracking process in step S110. Thus, in the still image photography mode, the tracking process is continued until the second release switch is turned on.

When determining in step S114 that the second release switch has been turned on, the CPU 1301 controls the display element driving circuit 122 so that the tracking frame is not displayed, in step S116.

In step S118, the CPU 1301 performs a process to record still image data in the recording medium 128. At the same time, the CPU 1301 controls the shutter driving mechanism 112 to close the shutter 110. The CPU 1301 then controls the diaphragm driving mechanism 108 to narrow the diaphragm 106 to the previously calculated aperture value. The CPU 1301 then controls the shutter driving mechanism 112 to release the shutter 110 for the previously calculated release time, and at the same time, performs the photography (exposure) by the imaging element 114. The CPU 1301 then processes, in the image processing circuit 1304, the still image data obtained via the imaging element 114. The CPU 1301 then provides a header to the still image data processed in the image processing circuit 1304 to generate a still image file, and records the generated still image file in the recording medium 128.

In step S120, the CPU 1301 additionally writes data that indicates the tracking position obtained as a result of the tracking process in step S110 in the still image file previously recorded in the recording medium 128. The CPU 1301 then ends the operation shown in FIG. 5.

When the photography setting is determined to be the moving image photography mode in step S100, the CPU 1301 starts the live view operation in step S122.

In step S124, the CPU 1301 determines whether the moving image button has been turned on. The CPU 1301 continues the live view operation until it is determined in step S124 that the moving image button has been turned on.

When determining in step S124 that the moving image button has been turned on, the CPU 1301 controls the display element driving circuit 122 so that the tracking frame is displayed on the display element 120, in step S126.

In step S128, the CPU 1301 performs the tracking process. The tracking process will be described later.

In step S130, the CPU 1301 performs an AF process to bring the subject at the tracking position into focus, and performs an AE process so that the exposure for the subject at the tracking position will be correct. In the AF process in step S130, the focus lens is driven to the in-focus position by the wobbling drive.

In step S132, the CPU 1301 performs a process to record moving image data in the recording medium 128, At the same time, the CPU 1301 controls the diaphragm driving mechanism 108 to narrow the diaphragm 106 to the aperture value calculated in the AE process. The CPU 1301 then causes the imaging element 114 to perform imaging (exposure) for a time corresponding to the shutter speed calculated in the AE process. After the end of the exposure, the CPU 1301 generates a moving image file and records the moving image file in the recording medium 128. The CPU 1301 processes, in the image processing circuit 1304, the moving image data obtained via the imaging element 114, and records, in the moving image file, the moving image data processed in the image processing circuit 1304.

In step S134, the CPU 1301 records data that indicates the tracking position obtained as a result of the tracking process in step S128 simultaneously with the moving image file previously recorded in the recording medium 128.

In step S136, the CPU 1301 determines whether the moving image button has been turned off. When determining in step S136 that the moving image button has not been turned off, the CPU 1301 performs processes after the tracking process in step S128. Thus, in the moving image photography mode, the tracking process and the recording of the moving image data are continued until the moving image button is turned off.

When determining in step S136 that the moving image button has been turned off, the CPU 1301, in step S138, controls the display element driving circuit 122 so that the tracking frame is not displayed. The CPU 1301 then ends the operation shown in FIG. 5.

Now, the tracking process as a tracking method according to the present embodiment is described.

Figure 6:
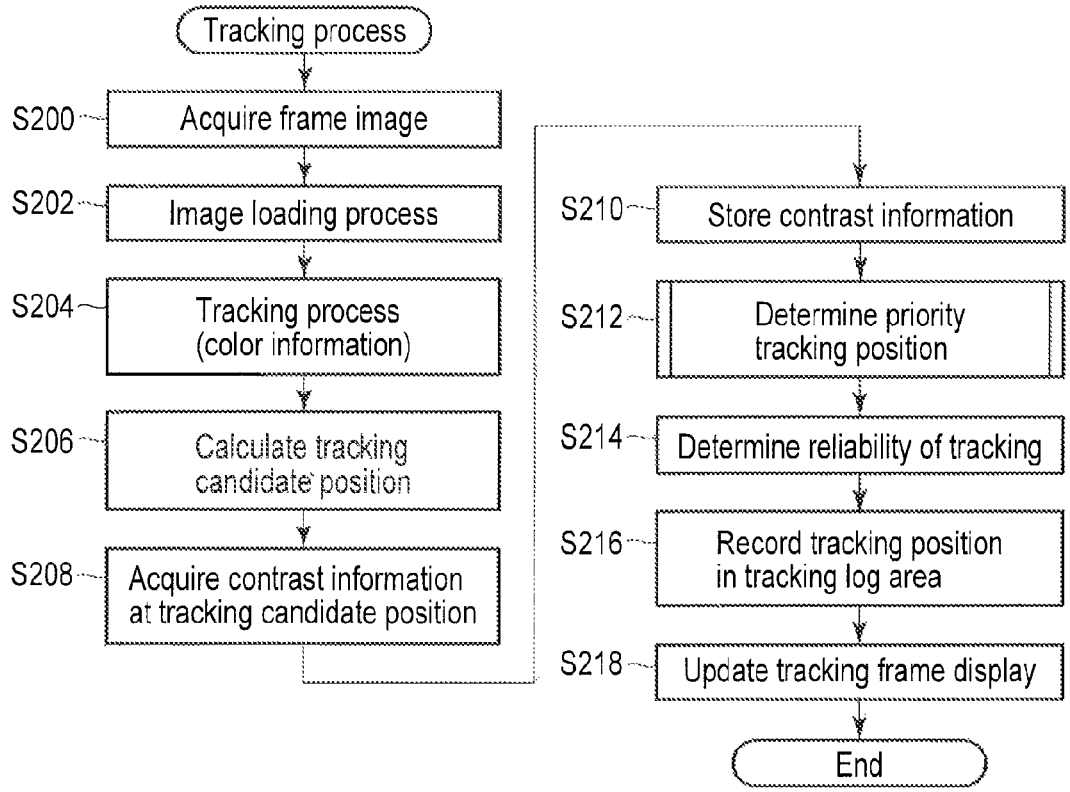
FIG. 6 is a flowchart showing the tracking process that uses the color information according to the embodiment of the present invention.

The tracking process that uses color information is described. FIG. 6 is a flowchart showing the tracking process that uses the color information.

In step S200, the CPU 1301 controls the imaging element interface circuit 116 to perform the imaging by the imaging element 114. In step S202, the CPU 1301 stores, into the RAM 118, image data obtained in the imaging element interface circuit 116 as a result of the imaging by the imaging element 114. Here, image data obtained in the initial tracking process is evaluation image data. Accordingly, the CPU 1301 stores the image data obtained in the initial tracking process into the evaluation image area of the RAM 118. Image data obtained in and after the second tracking process are reference image data. Accordingly, the CPU 1301 stores the image data obtained in and after the second tracking process into the reference image area of the RAM 118.

In step S204, the CPU 1301 uses the tracking process circuit 1306 to perform the tracking process that uses the color information. The tracking process that uses the color information has been described above, and is therefore not described again. In the initial tracking process, the evaluation image data is only acquired, so that processing in and after step S204 is omitted. The explanation that follows is based on the assumption that both the evaluation image data and the reference image data have been acquired. In step S206, the CPU 1301 store, a tracking position log area of the RAM 118, a tracking position obtained as a result of the tracking process that uses the color information, as a tracking candidate position.

In step S208, the CPU 1301 uses the contrast information acquisition circuit 1308 to acquire the contrast information at the tracking candidate position stored in step S206. In step S210, the CPU 1301 stores the acquired contrast information in the contrast information log area of the RAM 118. Here, the contrast acquisition area to acquire the contrast information may be set not only in the area at the tracking candidate position but also in the area of a predetermined size including the tracking candidate position. The size of the contrast acquisition area is preferably the same at every tracking candidate position.

In step S212, the CPU 1301 performs the priority tracking position determination process. The priority tracking position determination process is a process for determining which tracking candidate position to adopt when a plurality of tracking candidate positions are stored in the RAM 118 in the current frame. The priority tracking position determination process will be described later in detail.

In step S214, the CPU 1301 determines the reliability of the tracking position adopted as a result of the priority tracking position determination process. The reliability is determined, for example, by the saturation of the reference image data. More specifically, when the saturation of the tracking position of the reference image data is greater than or equal to a predetermined value, the tracking position is determined to be reliable. The thresholds for determining the reliability can be correctly set.

In step S216, the CPU 1301 records the final tracking position in the tracking position log area of the RAM 118. In the next (next-frame) tracking process, this final tracking position used as a start position of the tracking process. However, when the tracking position is determined to be unreliable in step S214, the tracking position may not be recorded.

In step S218, the CPU 1301 controls the display element driving circuit 122 to update the display position of the tracking frame to a position corresponding to the tracking position recorded in step S216. The CPU 1301 then ends the tracking process shown in FIG. 6.

Now, the priority tracking position determination process is described with reference to FIG. 7. In the priority tracking position determination process, the final tracking position in the current frame is determined by a similarity between the contrast information at each tracking candidate position in the current frame and the contrast information at the final tracking position determined in the past frame.

In step S300, the CPU 1301 determines whether a plurality of tracking candidate positions corresponding to the current frame have been recorded in the tracking position log area of the RAM 118.

When determining in step S300 that a plurality of tracking candidate positions corresponding to the current frame have been recorded in the RAM 118, the CPU 1301 calculates, in step S302, a similarity between the contrast information at the tracking position in the past frame and the contrast information at each tracking candidate position in the current frame. When the current frame is frame N, the similarity can be found as, for example, the difference between the contrast information at the tracking position in frame N−1 and the contrast information at each tracking candidate position in frame N. The similarity is higher when the difference is smaller.

In step S304, the CPU 1301 decides, as the final tracking position, the tracking candidate position having the contrast information with the highest similarity among the calculated similarities. The CPU 1301 then ends the priority tracking position determination process shown in FIG. 7.

When determining in step S300 that one tracking candidate position corresponding to the current frame has been only recorded in the RAM 118, the CPU 1301 decides this tracking candidate position as the final tracking position in step S306. The CPU 1301 then ends the tracking process shown in FIG. 7.

Figure 7:
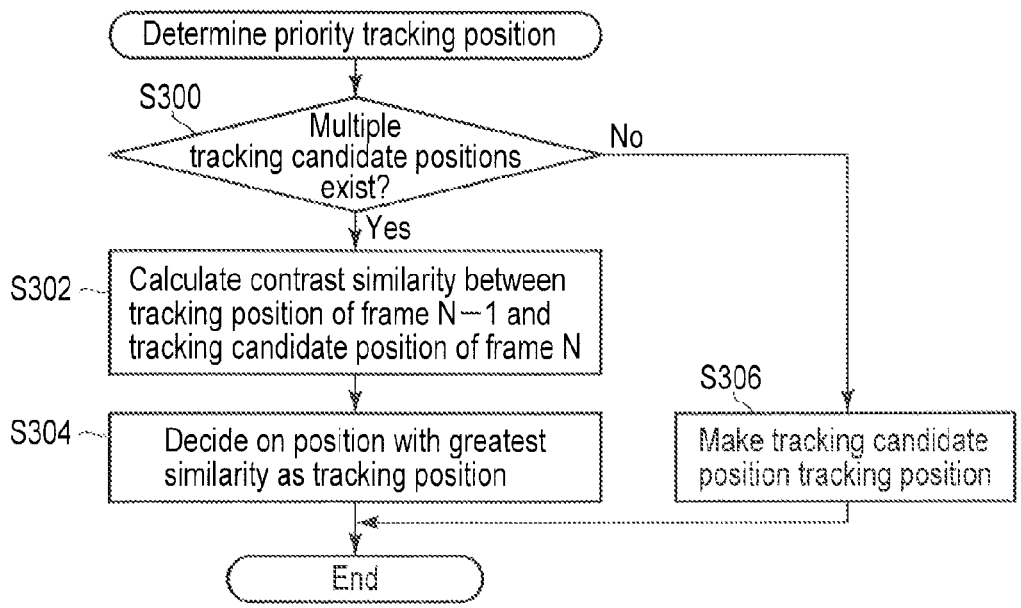
FIG. 7 is a flowchart showing a priority tracking position determination process.

Advantageous effects of the tracking process shown in FIG. 6 and FIG. 7 are described below.

Figure 8A:
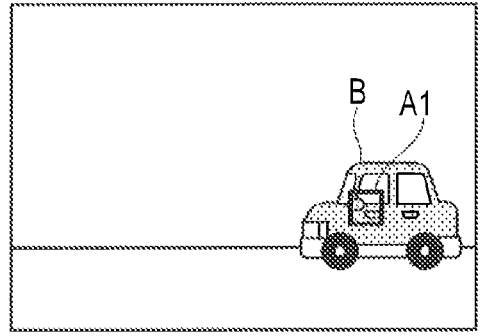
FIGS. 8A, 8B, and 8C are diagrams illustrating a conventional tracking process that uses color information.

To describe the advantageous effects of the tracking process, a conventional tracking process that uses color information is first explained. Suppose that a position A1 of a subject B shown in FIG. 8A has been specified as a tracking target in a given frame before a tracking process. In this case, image data shown in FIG. 8A is the evaluation image data. The tracking frame is then displayed at position A1.

Figure 8B:
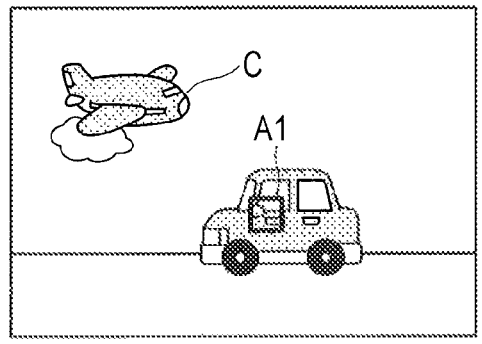
Figure 8C:
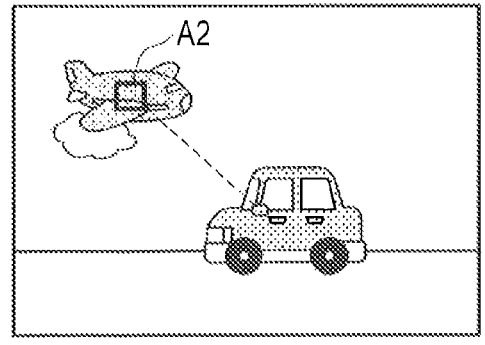

Suppose that a subject C has then approached subject B as shown in FIG. 8B in another frame. Subject C has the same color as the tracking target subject B. Suppose that image data for a frame including a plurality of subjects having the same color is used as the reference image data to perform the tracking process that uses the color information. In this case, the reference image data is searched for a region having the same color information as position A1 shown in FIG. 8A. In this case, the tracking position can be position A1 on subject B shown in FIG. 8B and can be a position A2 on subject C shown in FIG. 8C. If the tracking target changes as shown in FIG. 8C, a correct tracking process cannot be performed in the subsequent frames.

Figure 9A:
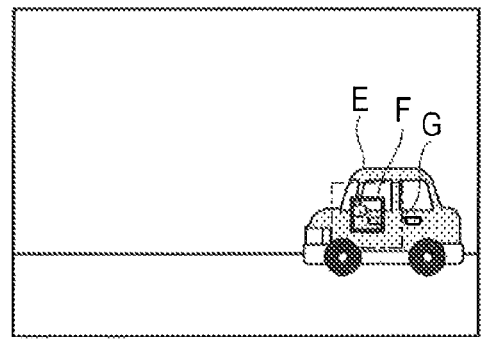
FIGS. 9A, 9B, and 9C are diagrams illustrating advantageous effects of the tracking process that uses the color information according to the embodiment of the present invention.

Now, advantageous effects of the application of the tracking process according to the present embodiment shown in FIG. 6 and FIG. 7 are described. Here, by way of example, suppose that a subject E shown in FIG. 9A is tracked, and the final tracking position obtained in the past frame is a position F. As the contrast information in the past frame, contrast information in a contrast acquisition area G having a predetermined size which includes the tracking position F is acquired.

Figure 9B:
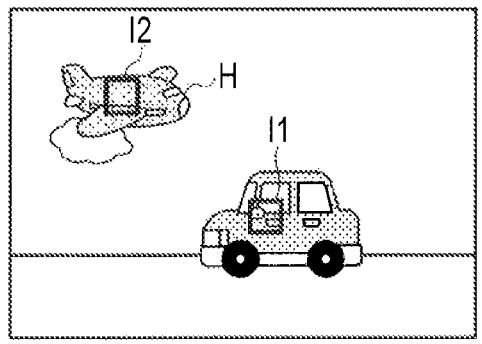

Suppose that subject F and a subject H are present in the current frame as shown in FIG. 9B. Subject E and subject H have the same color. In this case, in the tracking process that uses the color information, the region having the same color as the tracking position F is searched, and a tracking candidate position is calculated. In the example shown FIG. 9B, a position I1 on subject E and a position I2 on subject H are tracking candidate positions. Tracking candidate position I1 needs to be selected as the final tracking position.

Figure 9C:
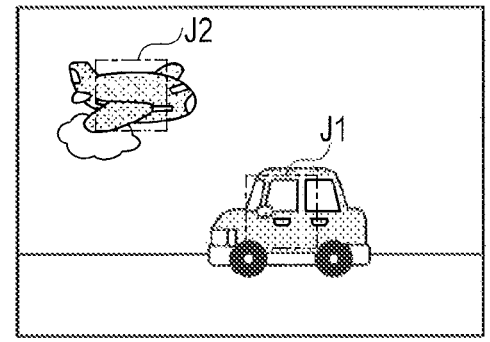

When there are a plurality of tracking candidate positions, contrast information is acquired in each of the tracking candidate positions. As the contrast information at tracking candidate position I1, contrast information in a contrast acquisition area J1 which includes tracking candidate position I1 and which has the same size as contrast acquisition area G is acquired as shown in FIG. 9C. As the contrast information at tracking candidate position I2, contrast information in a contrast acquisition area J2 which includes tracking candidate position I2 and which has the same size as contrast acquisition area G is acquired as shown in FIG. 9C.

The similarity of the contrast information is then evaluated. The similarity between the contrast information in contrast acquisition area G and the contrast information in contrast acquisition area J1 is maximal (the difference between both of the contrast information is 0). This is because the contrast information in contrast acquisition area G and the contrast information in contrast acquisition area J1 are contrast information in the same part. On the other hand, the similarity between the contrast information in contrast acquisition area G and the contrast information contrast acquisition area J2 is not maximal. This is because the contrast information in contrast acquisition area G and the contrast information in contrast acquisition area J2 are contrast information in different parts. In this way, tracking candidate position I1 is selected as the final tracking position.

Thus, the tracking process according to the present embodiment is not performed by only using the color information. In accordance with the similarity between the contrast information at the tracking position in the past frame and the contrast information at each tracking candidate position in the current frame, it is determined whether the subject at each of the tracking candidate positions obtained by using the color information corresponds to the subject at the tracking position in the past frame. If the similarity of the contrast information is high, it can be considered that the same subject as that in the past frame is likely to be tracked at the corresponding tracking candidate position. As a result of such a determination, according to the present embodiment, a correct tracking candidate position can be decided as the final tracking position even in a frame including a plurality of subjects of the same color.

When contrast acquisition areas are set for the respective tracking candidate positions to extract the contrast information, the contrast acquisition areas are set to the same size so that a tracking candidate position at which the similarity of the contrast information is maximal can be easily detected. This can reduce the possibility of an erroneous detection of the tracking position.

Figure 10:
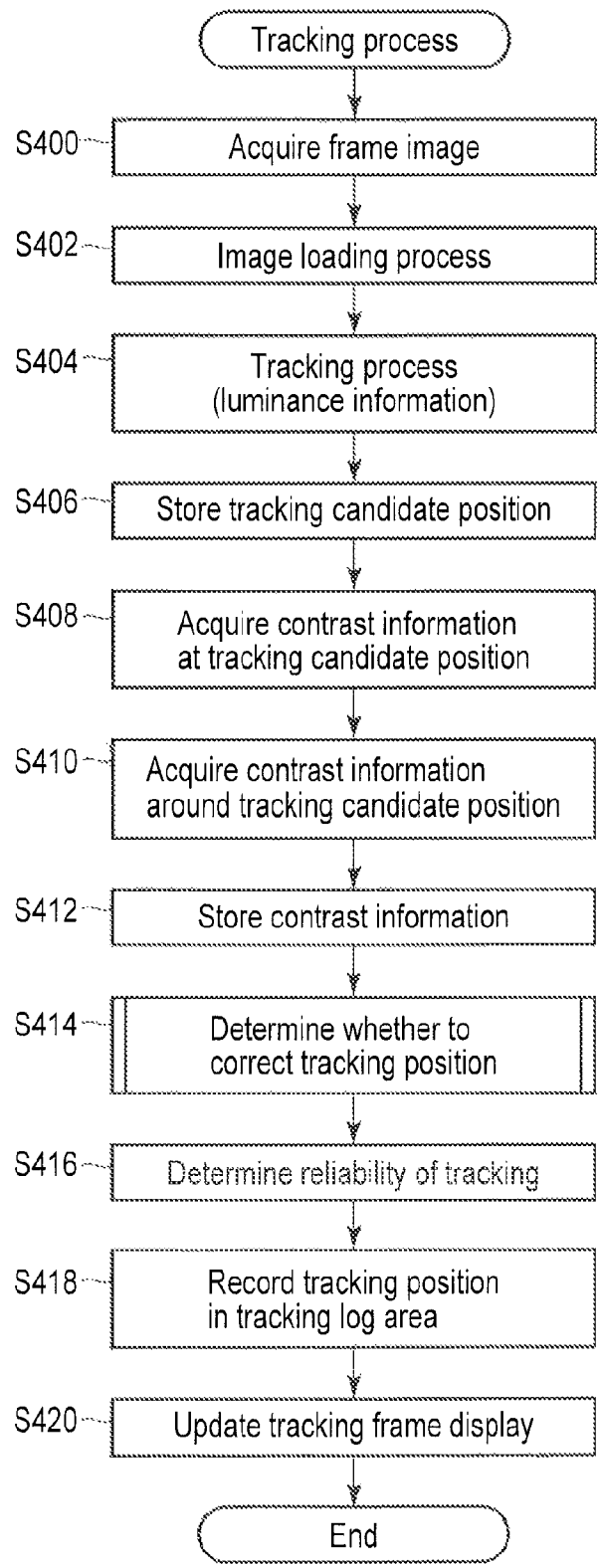
FIG. 10 is a flowchart showing the tracking process that uses the luminance information according to the embodiment of the present invention.

Now, the tracking process that uses the luminance information is described. FIG. 10 is a flowchart showing the tracking process that uses the luminance information.

In step S400, the CPU 1301 controls the imaging element interface circuit 116 to perform the imaging by the imaging element 114. In step S402, the CPU 1301 stores, into the RAM 118, image data obtained in the imaging element interface circuit 116 as a result of the imaging by the imaging element 114. Image data obtained in the initial tracking process is used as evaluation image data. Accordingly, the CPU 1301 stores the image data obtained in the initial tracking process into the evaluation image area of the RAM 118. Image data obtained in and after the second tracking process are used as reference image data. Accordingly, the CPU 1301 stores the image data obtained in and after the second tracking process into the reference image area of the RAM 118.

In step S404, the CPU 1301 uses the tracking process circuit 1306 to perform the tracking process that uses the luminance information. The tracking process that uses the luminance information has been described above, and is therefore not described again. In the initial tracking process, the evaluation image data is only acquired, so that processing in and after step S404 is omitted. The explanation that follows is based on the assumption that both the evaluation image data and the reference image data have been acquired. In step S406, the CPU 1301 stores, in the tracking position log area of the RAM 118, a tracking position obtained as a result of the tracking process that uses the luminance information, as a tracking candidate position.

In step S408, the CPU 1301 uses the contrast information acquisition circuit 1308 to acquire the contrast information at the tracking candidate position stored in step S406. In step S410, the CPU 1301 uses the contrast information acquisition circuit 1308 to acquire the contrast information in a plurality of contrast acquisition areas at peripheral positions of the tracking candidate position stored in step S406. A plurality of contrast acquisition areas are set around the contrast acquisition area at the tracking candidate position. Each of the contrast acquisition areas is preferably set to the same size as the contrast acquisition area at the tracking candidate position. In step S412, the CPU 1301 stores, in the contrast information log area of the RAM 118, the contrast information acquired in steps S408 and S410.

In step S414, the CPU 1301 performs the tracking position correction determination process. The tracking position correction determination process is a process for determining whether to correct the tracking position calculated in the current frame. The tracking position correction determination process will be described later in detail.

In step S416, the CPU 1301 determines the reliability of the tracking position adopted as a result of the tracking position correction determination process. The reliability is determined, for example, by data for each pixel in the reference image data. More specifically, when the sum of the differences between adjacent pixels in the tracking target region in the reference image data is less than or equal to a predetermined value, it is determined that the tracking position is reliable.

In step S418, the CPU 1301 records the final tracking position in the tracking position log area of the RAM 118. In the next (next-frame) tracking process, the final tracking position is used as a start position of the tracking process. However, when the tracking position is determined to be unreliable in step S416, the tracking position may not be recorded.

In step S420, the CPU 1301 controls the display element driving circuit 122 to update the display position of the tracking frame to a position corresponding to the tracking position recorded in step S418. The CPU 1301 then ends the tracking process shown in FIG. 10.

Now, the tracking position correction determination process is described with reference to FIG. 11. In the tracking position correction determination process, the final tracking position in the current frame is determined by a similarity between the contrast information in each contrast acquisition area in the current frame and the contrast information at the final tracking position determined in the past frame.

In step S500, the CPU 1301 determines whether the difference between the contrast information acquired in the contrast acquisition area at the tracking candidate position in the current frame (frame N) and the contrast information acquired in the contrast acquisition area at the tracking position finally decided in the past frame (frame N−1) is beyond a threshold.

When the CPU 1301 determines in step S500 that the difference between the contrast information acquired in the contrast acquisition area at the tracking candidate position in the current frame and the contrast information acquired in the contrast acquisition area at the tracking position in the past frame is beyond the threshold, that is, when the CPU 1301 determines that similarity between the contrast information at the tracking candidate position in the current frame and the contrast information at the tracking position in the past frame is low, the CPU 1301 calculates, in step S302, a similarity between the contrast information at the tracking position in the past frame and the contrast information in each of the contrast acquisition areas at the peripheral positions of the tracking candidate position in the current frame.

In step S504, the CPU 1301 determines whether the highest similarity among the calculated similarities is beyond a threshold, that is, whether the minimal value of the difference of the contrast information is lower than a threshold. When determining in step S504 that the highest similarity is beyond the threshold, the CPU 1301 decides, as the final tracking position, the position having the contrast information with the highest similarity in step S506. Here, when the contrast information at the tracking candidate position has the highest similarity, the tracking candidate position is decided as the final tracking position. The CPU 1301 then ends the tracking position correction determination process shown in FIG. 11.

Figure 11:
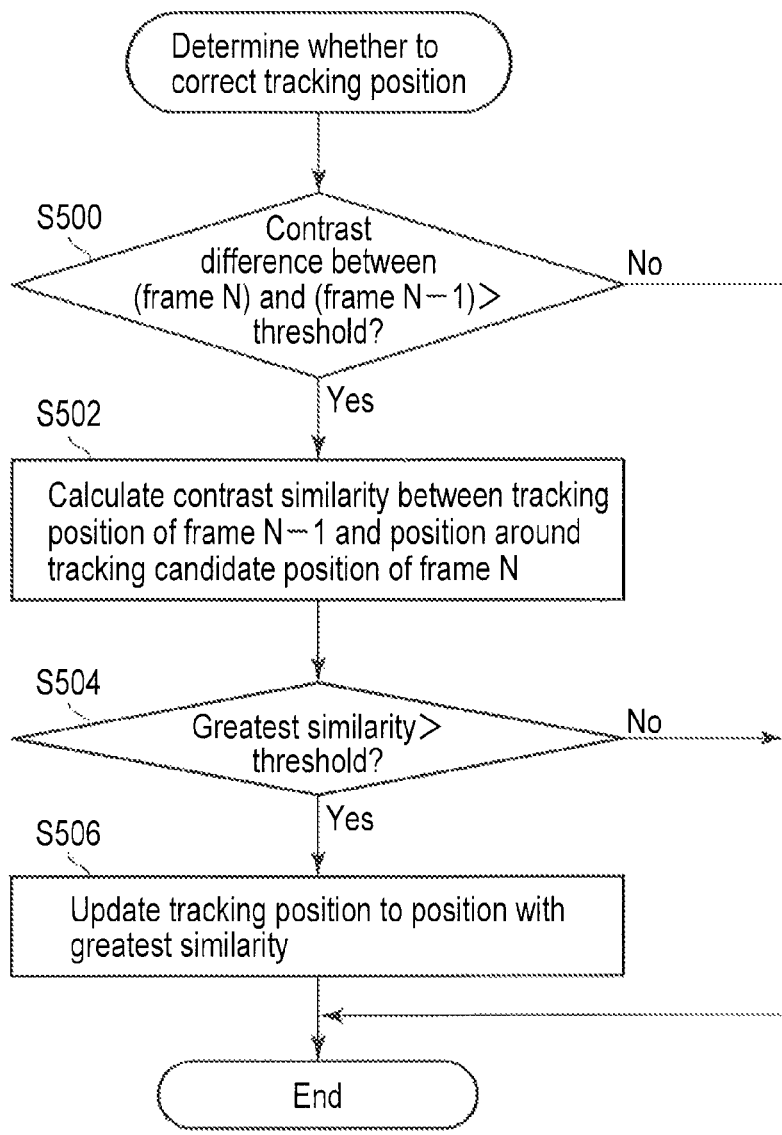
FIG. 11 is a flowchart a tracking position correction determination process.

When the CPU 1301 determines in step S500 that the difference between the contrast information acquired in the contrast acquisition area at the tracking candidate position in the current frame and the contrast information acquired in the contrast acquisition area at the tracking position in the past frame is not beyond the threshold, or when the CPU 1301 determines in step S504 that highest similarity is not beyond the threshold, the CPU 1301 ends the tracking position correction determination process shown in FIG. 11. In this case, the tracking position is not corrected, and the tracking candidate position will be the final tracking position.

Advantageous effects of the tracking process shown in FIG. 10 and FIG. 11 are described below.

Figure 12A:
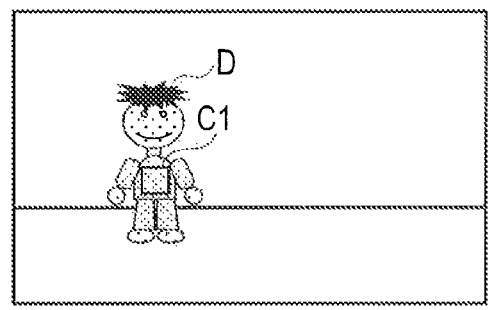
FIGS. 12A, 12B, and 12C are diagrams illustrating the conventional tracking process that uses luminance information.

To describe the advantageous effects of the tracking process, a conventional tracking process that uses luminance information is first explained. Suppose that a position C1 of a subject D (the breast of the subject) shown in FIG. 12A has been specified as tracking target in a given frame before a tracking process. In this case, image data shown in FIG. 12A is the evaluation image data. Image data at the position C1 in the evaluation image data serves as the standard image data. The tracking frame is then displayed at the position C1.

Figure 12B:
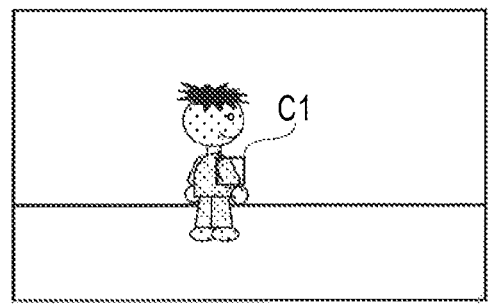

Suppose that the subject D has then moved as shown in FIG. 12B in another frame. In the example shown in FIG. 12B, the subject D which has been facing forward is now facing sideways. Suppose that the tracking process that uses the luminance information is performed while the subject D is thus moving. As described above, in the tracking process that uses the luminance information, the reference image data searched for image data similar to the standard image data. When the subject is facing sideways, a large volume of image data similar to the image data (standard image data) regarding the breast of the subject facing forward is contained, so that the breast of the subject D can be correctly tracked.

Figure 12C:
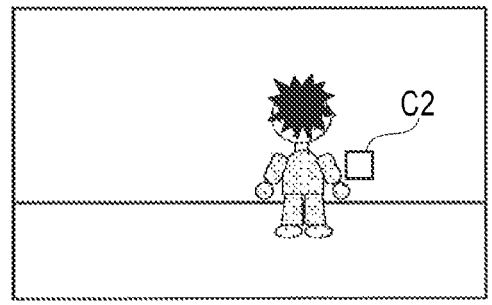

Suppose that the subject D has further moved as shown in FIG. 12C in another frame. In the example shown in FIG. 12C, the subject D which has been facing sideways is now facing backward. Suppose that the tracking process that uses the luminance information is performed while the subject D is thus moving. Here, when the subject is facing backward, almost no image data similar to the image data (standard image data) regarding the breast of the subject facing forward is contained, so that it may be impossible to track the breast of the subject D. In particular, for example, when the subject D is wearing clothes having different designs on its breast and back, there is a strong possibility that the tracking target is lost and the tracking process cannot be performed.

Figure 13A:
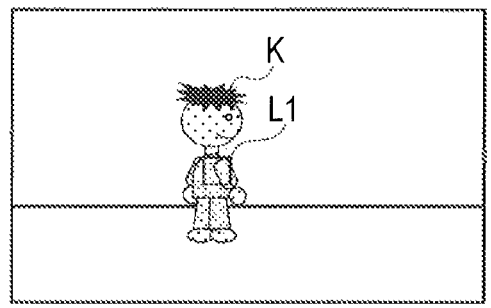
FIGS. 13A, 13B, 13C, and 13D are diagrams illustrating advantageous effects of the tracking process that uses the luminance information according to the embodiment of the present invention.

Now, advantageous effects of the application of the tracking process according to the present embodiment shown in FIG. 10 and FIG. 11 are described. Here, by way of example, a position L1 of a subject K shown in FIG. 13A is tracked.

Figure 13B:
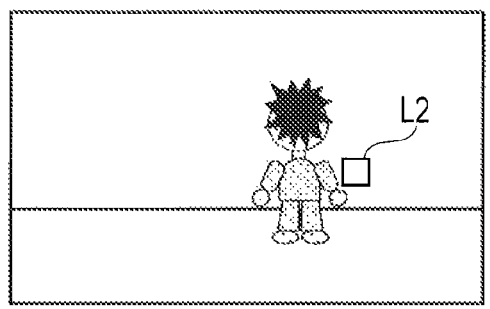

Suppose that the subject K which has been facing sideways is now facing backward in a given frame as shown in FIG. 13B and that the tracking target is thus lost so that the tracking candidate position is changed to L2. In this case, the difference between the contrast information at the tracking position L1 and the contrast information at the tracking candidate position L2 is great (the similarity is low).

Figure 13C:
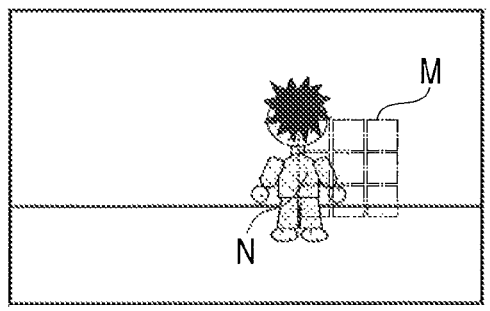

In the example shown in FIG. 13B, the difference between the contrast information at the tracking position L1 and the contrast information at the tracking candidate position L2 is great. Therefore, the similarity between the contrast information at the tracking position L1 and the contrast information at a peripheral position H of the tracking candidate position L2 shown in FIG. 13C is evaluated. Here, in the example shown in FIG. 13C, the peripheral position M is composed of eight contrast acquisition areas arranged around the tracking candidate position L2. Each of the contrast acquisition areas is preferably set to the same size as the tracking position L1. There may be eight or more contrast acquisition areas of the peripheral position M. For example, there may be 5×5 contrast acquisition areas including the tracking candidate position L2. In this case, the peripheral position M is composed of 24 contrast acquisition areas. Less than eight contrast acquisition areas may be included in the peripheral position M. For example, contrast acquisition areas may be only arranged on the top, bottom, right, and left of the tracking candidate position L2. In this case, the peripheral position M is composed of four contrast acquisition areas.

Figure 13D:
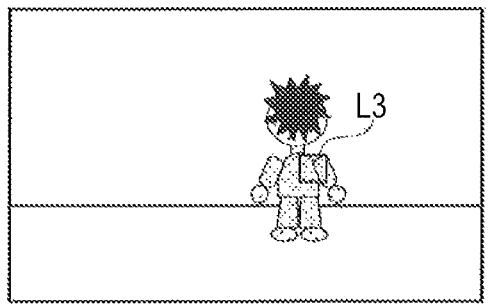

The similarity of the contrast information including the peripheral position M is evaluated. In the example shown in FIG. 13C, the similarity between the contrast information in a contrast acquisition area N and the contrast information at the tracking position L1 is evaluated as being highest. This is because the contrast acquisition area N is the area on the subject K. When the similarity in the contrast acquisition area N is determined to be beyond a threshold, the tracking position of the current frame is corrected to a position L3 corresponding to the contrast acquisition area N from the tracking candidate position L2 as shown in FIG. 13D.

Thus, in the tracking process according to the present embodiment, when the subject at the tracking candidate position obtained by the tracking process that uses the luminance information is not the subject of the original tracking target, the contrast information at the peripheral position of the tracking candidate position is used to search for the tracking target subject. If the subject has not made a great movement, the subject of the original tracking target is considered to be around the tracking candidate position. The tracking position is searched for in this way. Thus, according to the present embodiment, even if the tracking target subject is lost, the tracking position can be corrected to a correct tracking position in the end.

The contrast acquisition area at the tracking candidate position and each of the contrast acquisition areas at the peripheral positions have the same size so that the similarity of the contrast information can be easily compared. Consequently, the possibility of an erroneous detection of the tracking position can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tracking apparatus comprising:
an image data acquisition unit configured to acquire image data per frame;
a tracking process unit configured to detect a candidate position of a tracking target in each image data acquired per frame;
a contrast information acquisition unit configured to acquire contrast information at the candidate position;
a peripheral contrast information acquisition unit configured to acquire peripheral contrast information at peripheral contrast information acquisition areas around the candidate position;
a contrast information similarity evaluation unit configured to evaluate a difference between contrast information at a tracking position of the tracking target decided in a past frame and contrast information at the candidate position in a current frame to determine whether the candidate position is a tracking position of the tracking target in the current frame or whether the tracking target is lost;
when the difference is lower than a threshold value, a control unit decides that the candidate position is the tracking position of the tracking target in the current frame; and
when the difference is higher than the threshold value, a tracking position correction determination causes the contrast information similarity evaluation unit to evaluate a similarity between the contrast information at the tracking position of the tracking target decided in the past frame and the peripheral contrast information of the peripheral contrast information acquisition areas, and decides that a peripheral contrast information acquisition area having the highest similarity among the peripheral contrast information acquisition areas is the tracking position of the tracking target in the current frame.

2. The tracking apparatus according to claim 1, wherein the peripheral contrast information acquisition unit sets peripheral contrast acquisition areas of the same size.

3. The tracking apparatus according to claim 2, wherein the tracking process unit detects the candidate position of the tracking target in accordance with luminance information for the tracking target.

4. A tracking method comprising:
causing an image data acquisition unit to acquire image data per frame;

causing a tracking process unit to detect a candidate position of a tracking target in each image data acquired per frame;

causing a contrast information acquisition unit to acquire contrast information at the candidate position;

causing a peripheral contrast information acquisition unit to acquire peripheral contrast information at peripheral contrast information acquisition areas around the candidate position;

causing a contrast information similarity evaluation unit to evaluate a difference between contrast information at a tracking position of the tracking target decided in a past frame and contrast information at the candidate position in a current frame to determine whether the candidate position is a tracking position of the tracking target in the current frame or whether the tracking target is lost;

when the difference is lower than a threshold value, causing a control unit to decide that the candidate position is the tracking position of the tracking target in the current frame; and when the difference is higher than the threshold value, causing a tracking position correction determination unit to cause the contrast information similarity evaluation unit to evaluate a similarity between the contrast information at the tracking position of the tracking target decided in the past frame and the peripheral contrast information of the peripheral contrast information acquisition areas, and decides that a peripheral contrast information acquisition area having the highest similarity among the peripheral contrast information acquisition areas is the tracking position of the tracking target in the current frame.

* * * * *